(No Model.) 2 Sheets—Sheet 2.
J. B. WARREN & C. W. JONES.
BICYCLE BRAKE.
No. 591,994. Patented Oct. 19, 1897.
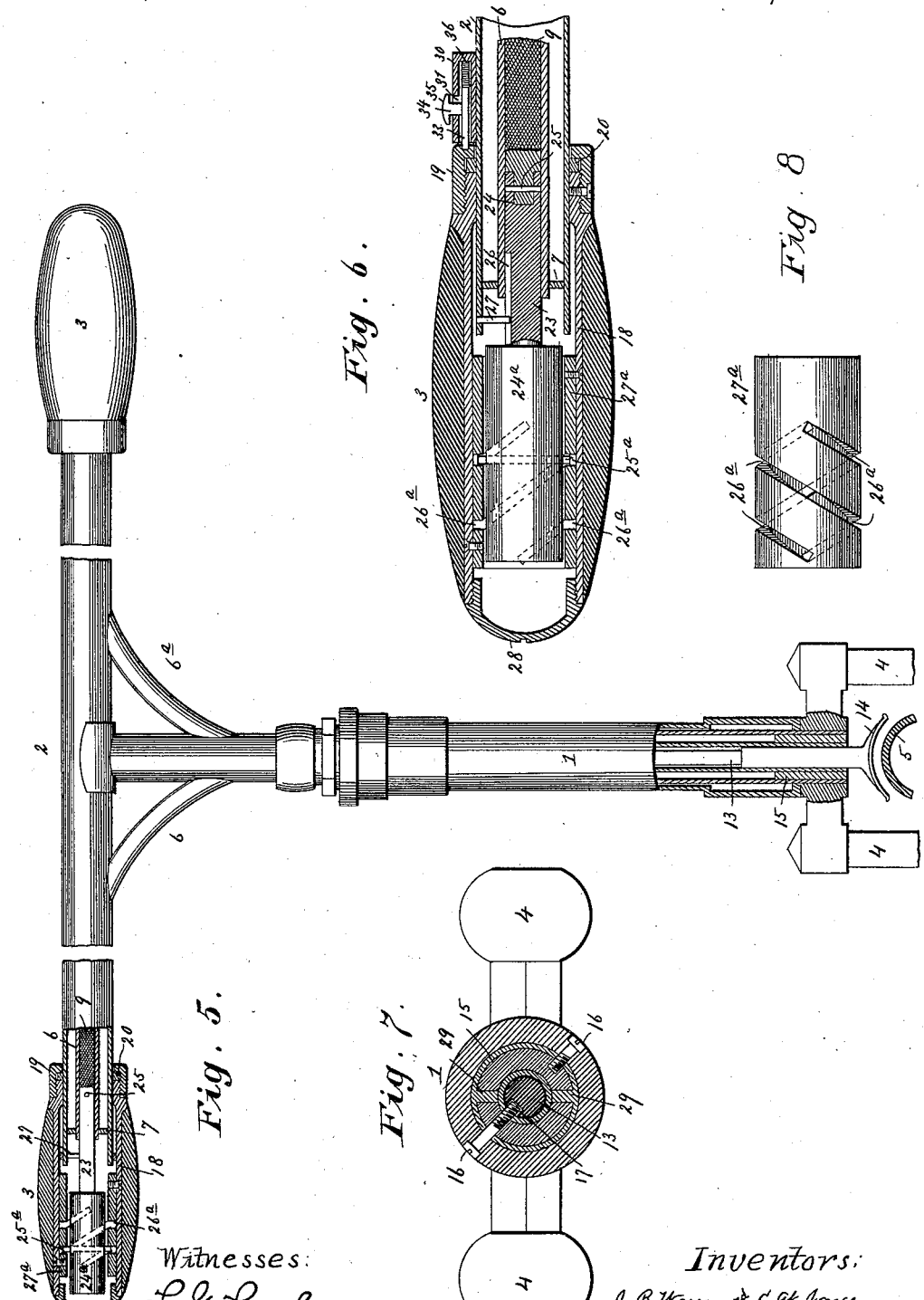
Witnesses:
F. G. Fischer
G. H. Thorpe
Inventors:
J. B. Warren & C. W. Jones
By Higdon & Higdon
Attys.
THE NORRIS PETERS CO., PHOTO-LITHO., WASHINGTON, D. C.

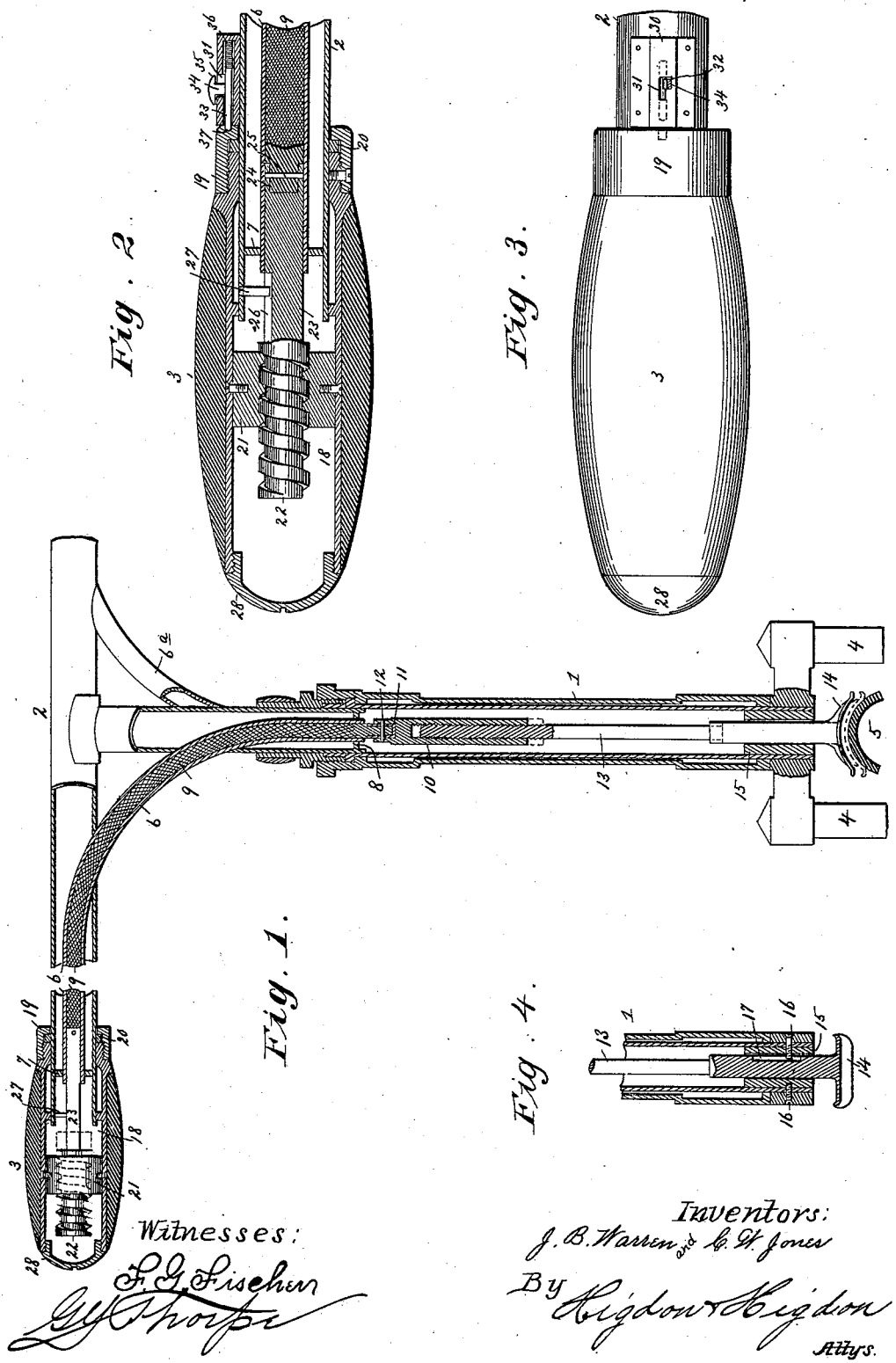

UNITED STATES PATENT OFFICE.

JOHN B. WARREN AND CHARLES W. JONES, OF KANSAS CITY, MISSOURI.

BICYCLE-BRAKE.

SPECIFICATION forming part of Letters Patent No. 591,994, dated October 19, 1897.

Application filed April 6, 1896. Serial No. 586,438. (No model.)

*To all whom it may concern:*

Be it known that we, JOHN B. WARREN and CHARLES W. JONES, of Kansas City, Jackson county, Missouri, have invented certain new and useful Improvements in Bicycle-Brakes, of which the following is a full, clear, and exact description, reference being had to the accompanying drawings, forming a part hereof.

Our invention relates to bicycle-brakes, and our object is to produce a brake which may be applied to a bicycle without detracting from its appearance or materially adding to its weight, and which is simple, strong, durable, and inexpensive of construction.

To this end the invention consists in certain novel and peculiar features of construction and combinations of parts, as hereinafter described and claimed.

In order that the said invention may be fully understood, reference is to be had to the accompanying drawings, wherein—

Figure 1 represents a sectional view taken through the steering-head bar and handle-bar of a bicycle and discloses therein brake mechanism embodying our invention. Fig. 2 represents, on an enlarged scale, a longitudinal section of the handle used in connection with and to operate our improved brake mechanism. Fig. 3 is an external view of said handle. Fig. 4 is a vertical section of the lower end of the steering-head bar and the inclosed mechanism, said section being taken in a plane at right angles to the section illustrated in Fig. 1. Fig. 5 is a view, partly in elevation and partly in vertical section, of the front end of a bicycle provided with our improved brake mechanism, which in this instance, however, is of a slightly-modified construction. Fig. 6 is an enlarged sectional view of the handle connected with said brake mechanism. Fig. 7 is a cross-sectional view, on an enlarged scale, taken just above the front forks. Fig. 8 represents a spirally-slotted sleeve, which is secured within and rotates with the handle.

Similar reference-numerals designate like parts in all of the figures, wherein—

1 designates the steering-head bar of a bicycle. 2 designates the handle-bar, secured to the upper end of the steering-head bar in the customary manner, and provided with handles 3, one of which is adapted to be used in connection with the improved brake mechanism hereinafter described. 4 designates the front forks, and 5 the tire, of the front wheel. All of the parts thus far described are common in bicycles.

6 designates a tube which is arranged centrally of the steering-head bar and curves upwardly and outwardly and enters the handle-bar, wherein it is centrally disposed. Its outer end terminates, preferably, just inward of the inner end of the handle-bar, and is held reliably in position by means of a collar or centering-flange 7, preferably, but may be secured in any other suitable or preferred manner. Its lower end is also preferably centered in the steering-head bar, by means of a collar or flange 8, in a smilar manner. 9 designates a wire cable of sufficient flexibility only to conform easily to the curvature of said tube 6, within which it snugly fits and beyond which its lower end projects.

10 designates an internally-threaded coupling tube or sleeve, which is provided with a socket 11 in its upper end, wherein fits and is secured by a rivet 12 the lower end of the cable 9.

13 designates a brake-rod which is threaded at its upper end and engages adjustably the internally-threaded sleeve 10. Said rod 13 extends vertically through the steering-head bar and carries at its lower end in the customary manner the usual spoon-brake 14, which, however, we prefer to line or reinforce at its under side with leather or equivalent material, whereby increased friction may be had with the periphery of the wheel 5 in order to more quickly and reliably retard the bicycle when in rapid motion. Said rod extends through the centering-collar 15 in the lower end of the steering-head bar, said collar being secured in such position firmly and reliably by the screw-bolts 16. (See Figs. 4 and 7.) One of said bolts also projects into a vertical or longitudinal groove 17 in the brake-carrying rod, whereby the latter is prevented from twisting under any strain imposed upon it, or from twisting when being adjusted upwardly or downwardly.

Referring now to the detail construction of the handle used in connection with the brake mechanism already described, 18 designates a sleeve which rotatably embraces the handle-bar and is screwed firmly and reliably onto the nut 19, also rotatably embracing said handle-bar. Said nut, however, and handle are held reliably in position by means of the annular collar or flange 20, which is embraced at its opposite sides by the sleeve 18 and by said nut, as illustrated clearly in the drawings. Secured rigidly to the handle-sleeve 18 at a suitable point is an internally-threaded worm-wheel 21. 22 designates a worm-rod, which engages said worm-wheel and is provided at its inner end with a stem 23. Said stem projects into the opposing end of the tube 6 and is provided with a socket 24 to receive the reduced outer or upper end of the cable 9, and this relation is made permanent by means of the rivet 25. To prevent said worm rotating under the action of the worm-wheel, hereinafter to be described, said stem is provided with a longitudinal slot 26, wherein projects a pin 27, secured rigidly to the handle-bar. The outer end of the sleeve 18 is closed and the outer end of the handle formed by the rounded nut 28, which screws into said sleeve.

From the above description it is apparent that, by rotating the handle described in one direction or the other, longitudinal movement either outward or inward is imparted to the worm-rod 22, which, through the medium of flexible connection 9 within the guide-tube 6, causes the brake-rod to move downward or upward and thereby apply the brake or release the wheel.

In practice the pitch of the worm-threads is such that it requires only about half a revolution of the handle to cause the brake-spoon to impinge tightly upon the wheel, and it is also obvious that it is absolutely impossible for the pressure of said brake to be diminished until the handle is rotated in the opposite direction. It will be seen in case the brake is not applied with sufficient power by a single twisting movement of the rider's hand that he may release the handle to take a new grip preliminary to another twisting operation and that while so doing the brake maintains its frictional relation with the wheel already established. Thus it will be noticed that this construction permits the application of power to be gaged to the necessities of the occasion—for instance, in coming down grade the brake may be lightly applied, but, if it be found that the momentum acquired is too rapid, the speed may be further retarded by a further application of the brake, or the wheel may be brought to a stop quickly and easily by rotating the handle only about half-way around, which can be done in an instant.

By means of the detachable connection within the sleeve 10 of the brake-carrying rod 13 it is obvious also that this brake mechanism may be lengthened or shortened to accommodate varying heights of the handle-bars.

Referring now to Sheet 2 of the drawings, it will be noticed that, in lieu of the worm-gear already described, we employ a mechanical equivalent and modification of the same. In this case instead of the worm-rod we provide the stem 23 with a cylindrical head 24ª, preferably tubular, and projecting diametrically through and secured to the same is a pin 25ª. The opposite ends of said pin project into the spiral slots 26ª in a collar 27ª, secured rigidly within the sleeve 18. (Shown most clearly in Fig. 8.) These slots obviously as the handle is rotated cause longitudinal movement in one direction or the other of the stem 23, and thereby force the brake-spoon against the wheel or lift it from engagement with the same, as hereinbefore described.

In case the steering-head bar is provided with an internal cross-rib or brace 29, as is customary in a great many different styles of bicycles at present in use, it is necessary to bore out such rib or brace for its entire length in order that the brake-carrying rod may be secured in position, and it is also necessary that the collar 15 be slotted or halved to receive such rib, as shown clearly in Fig. 7. This construction, however, is merely to adapt the brake to a style of bicycle now in common use and is not a departure from the spirit or scope of the invention. In all other respects the brake is precisely similar to the one illustrated on sheet 1 of the drawings, as the handle mechanisms are mechanical equivalents.

In order not to detract from or unbalance the appearance, we preferably employ a "blind" tube 6ª at the opposite side of the steering-head bar from the tube 6. This gives the wheel a symmetrical appearance. In order to prevent the brake being applied accidentally, we have provided a device for locking the handle from rotation. This device comprises simply a casing 30, having a longitudinal slot 31, provided with an offset 32 at its inner end. This casing is screwed to the handle-bar adjacent to the brake-handle, and fitting slidingly therein is a bolt 33, provided with an arm 34, which projects outwardly through said slot, and which is provided with a small head or button 35 at its outer end, and said bolt is held normally with a yielding pressure by the spring 36 into engagement with a cavity or hole 37 in the opposing face of the nut or tap 19, as shown clearly in Fig. 2, and at the same time the arm 34 occupies the outer end of the slot 31. When this relation is established, it is obvious that the handle cannot be turned and therefore that the brake cannot be applied. When, however, it is deemed desirable or necessary to prepare for the application of the brake, the rider by a simple movement of his thumb or finger against the head or button 35 disengages the bolt 33 from the cavity or hole 37 by re-pressing the spring, and then rotates the bolt slightly, so that the arm 34 will enter the offset 32 of the slot 31, where the pressure of the spring will hold it until it is again desired to lock the handle-bar, and therefore the brake, from movement, when said bolt-manipulation is reversed and it is again permitted to bear with yielding pressure against the opposing face or end of said nut or tap. When this is done, it reënters said opening the instant the latter by the rotation of the handle reregisters with the bolt. Thus it will be seen that we have produced a device of simple and inexpensive construction for locking the handle from movement in either direction before or after the brake is applied.

From the above description it will be seen that we have produced a bicycle-brake which is simple, strong, durable, positive and effective in its action, and which does not materially increase the weight of the wheel or detract from the appearance of the same. It is to be understood, of course, that such changes in the form, proportion, or detail construction of the parts as do not depart from the spirit or scope of our invention will be considered infringements of the same.

Having thus described our invention, what we claim as new, and desire to secure by Letters Patent, is—

1. A bicycle-brake, comprising an arc-shaped tube projecting at its ends into the steering-head bar and the handle-bar of a bicycle, a brake-carrying rod extending longitudinally within the steering-head bar, a stiff cable extending through and closely embraced by said arc-shaped tube, and connected at its lower end to the brake-carrying rod, and a rotatable handle mounted at one end of the handle-bar and geared to said cable so that the latter, by compression, may cause the brake to be applied.

2. In a bicycle-brake, the combination of a steering-head bar, a handle-bar, an arc-shaped guide-tube projecting at its ends into the steering-head bar and the handle-bar, a brake-carrying rod extending longitudinally within the steering-head bar, a stiff cable extending through and closely embraced by said arc-shaped tube and connected at its lower end to the brake-carrying rod, a grooved worm-rod secured to the upper end of the cable, a pin projecting from the handle into the groove of said worm-rod, a handle rotatably mounted upon said handle-bar and provided internally with a worm-wheel engaging said worm-rod, and a collar to prevent longitudinal movement of said handle upon the handle-bar, and means to lock the handle from rotatable movement substantially as described.

In testimony whereof we affix our signatures in presence of two witnesses.

JOHN B. WARREN.
CHARLES W. JONES.

Witnesses:
 G. Y. THORPE,
 H. E. PRICE.